(12) United States Patent
Nakazawa et al.

(10) Patent No.: US 6,859,985 B1
(45) Date of Patent: Mar. 1, 2005

(54) BLADE ATTACHING STRUCTURE OF WIPER UNIT

(75) Inventors: Akira Nakazawa, Nitta-gun (JP); Yoshinori Masuda, Kiryu (JP)

(73) Assignee: Mitsuba Corporation, Kiryu (JP)

( * ) Notice: Subject to any disclaimer, the term of this patent is extended or adjusted under 35 U.S.C. 154(b) by 0 days.

(21) Appl. No.: 09/937,626

(22) PCT Filed: Apr. 4, 2000

(86) PCT No.: PCT/JP00/02175

§ 371 (c)(1),
(2), (4) Date: Oct. 22, 2001

(87) PCT Pub. No.: WO00/61409

PCT Pub. Date: Oct. 19, 2000

(30) Foreign Application Priority Data

Apr. 12, 1999 (JP) .......................................... 11-103980

(51) Int. Cl.⁷ .................................................. B60S 1/40
(52) U.S. Cl. ................. 29/428; 15/250.351; 15/250.32; 403/353; 403/154; 403/161; 403/79
(58) Field of Search ...................... 15/250.32, 250.351; 403/119, 353, 3, 154, 24, 161, 79; 29/428

(56) References Cited

U.S. PATENT DOCUMENTS

| | | | | | |
|---|---|---|---|---|---|
| 2,404,523 | A | * | 7/1946 | Israel ....................... | 15/250.32 |
| 3,576,044 | A | * | 4/1971 | Besnard .................... | 15/250.32 |
| 3,659,309 | A | * | 5/1972 | Besnard .................... | 15/250.32 |
| 4,348,782 | A | * | 9/1982 | Fournier ................... | 15/250.32 |
| 4,450,602 | A | * | 5/1984 | Maiocco ................... | 15/250.32 |
| 6,226,829 | B1 | * | 5/2001 | Kotlarski .................. | 15/250.32 |

FOREIGN PATENT DOCUMENTS

| | | | | |
|---|---|---|---|---|
| DE | 44399 | * | 6/1950 | .............. 15/250.32 |
| JP | 58-6653 | * | 1/1983 | |

* cited by examiner

*Primary Examiner*—Gary K. Graham
(74) *Attorney, Agent, or Firm*—Oliff & Berridge, PLC

(57) ABSTRACT

A blade attaching structure including a connecting shaft on a blade side detachably supported on an attaching groove formed on a wiper arm, wherein secure fixation becomes possible while attaching and detaching operations are simplified. An attaching groove formed on a wiper arm has a dovetail groove shape having a groove entrance portion with a groove width, the connecting shaft including a fixed shaft fixed on a bracket and a spacer having a cylinder sliding portion which is incorporated in the fixed shaft to be slidable in the rotational direction of the shaft. A chamfered portion is formed on the cylindrical sliding portion, a small diameter portion having a diameter which is the same as or smaller than the groove width is formed, and based on making the cylindrical sliding portion slide by operating a lever portion, the relationship between the attaching groove and connecting shaft is changed in posture to the attaching and detaching postures where the small diameter portion is opposed to the groove entrance portion and to the connected posture where the groove entrance portion is blocked.

7 Claims, 14 Drawing Sheets

BLADE ATTACHING STRUCTURE OF WIPER UNIT

TECHNICAL FIELD

The present invention belongs to the technical field of a blade attaching structure of a wiper unit which is mounted on vehicles such as automobiles, buses, and trucks.

BACKGROUND ART

In general, this type of wiper unit is constructed by detachably attaching a blade on the front end of a wiper arm so that the blade can be replaced if necessary. As such attaching structures, there is, for example, a structure in that the groove width of a dent groove formed on the front end portion of the wiper arm is made into a so-called dovetail groove shape having a narrower width on the entrance side and a wider width on the inner side, while an attaching pin, which is set to a diameter approximately the same as the dimension of the groove inner side of the dent groove, is provided on a portion of the blade where the wiper arm is to be attached, and attachment is performed by fitting the dent groove onto the said attaching pin in a forcibly fitted manner.

However, in the above-described prior art, it is necessary to take measures so that the blade does not unexpectedly come off from the wiper arm, and for this purpose, a prevention against coming-off may be carried out by reducing the dimension of the groove width at the entrance side of the dent groove. In such a case, there is a problem in that inserting and drawing operation of an attaching pin with respect to the dent groove becomes troublesome during blade replacement and the operation cannot be performed easily. Furthermore, in a case where the inserting and drawing operation is repeatedly performed with a wiper arm formed of a resin material, it is assumed that the dent groove is worn or damaged. Accordingly, there is an apprehension that use of the wiper unit becomes impossible and the whole wiper unit must be replaced, thus causing a problem. These problems are solved by the present invention.

DISCLOSURE OF THE INVENTION

In the circumstances as described above, the present invention is created with the aim of solving the above problems and provides a wiper unit constructed by detachably and rotatably supporting a connecting shaft, which is provided on a blade for wiping a window surface, on an attaching groove provided on the front end of a wiper arm, wherein as the attaching groove, a groove inner portion having a large diameter and a groove entrance portion having a width narrower than the said groove inner portion are formed and the posture of the attaching groove and the connecting shaft is changed to a connected posture where a coming-off prevention is carried out from the groove entrance portion and to an attaching and detaching posture where entry and exit can be freely carried out from the groove entrance portion.

In particular, the connecting shaft is supported on the blade so as to be slidable in the direction of shaft rotation, a large diameter portion and a small diameter portion are formed by a chamfered portion formed on the outer circumference, and based on making the connecting shaft slide in the direction of shaft rotation by operating a adjusting member which is integrally formed on the connecting shaft end portion, the posture is changed.

In addition, by externally fitting, so as to be slidable in the direction of shaft rotation, a cylindrical sliding portion having a chamfered portion formed on the outer circumference thereof to the stationary shaft which is integrally fixed to a blade, a large diameter portion and a small diameter portion are formed to the connecting shaft, and based on the slide of the cylindrical sliding portion in the direction of shaft rotation, the posture is changed.

Furthermore, the connecting shaft is integrally fixed to the blade, a large diameter portion and a small diameter portion are constructed by a chamfered portion formed on the outer circumference, and based on changing the attaching groove in posture by turning the wiper arm with respect to the blade, the posture is changed.

Still furthermore, the connecting shaft is attached to the blade, a long concave groove is formed on the outer circumference in the shaft direction, and by rotating the connecting shaft in a condition where the groove entrance portion is fitted with the said dent groove, the attaching and detaching posture, which enables free entrance and exit with respect to the groove inner portion, is produced.

Moreover, herein, the groove width of the groove entrance portion of the attaching groove is made slightly smaller than the inside diameter of the groove inner portion, while the connecting shaft comprises a stationary shaft which is integrally fixed to the blade and a stopper pin which prevents the stationary shaft, which is internally fitted to the groove inner portion, from coming off at the groove entrance portion, and the attaching groove and the connecting shaft are changed posture based on attachment and detachment of the stopper pin.

BEST MODE FOR CARRYING OUT THE INVENTION

Figure 1:
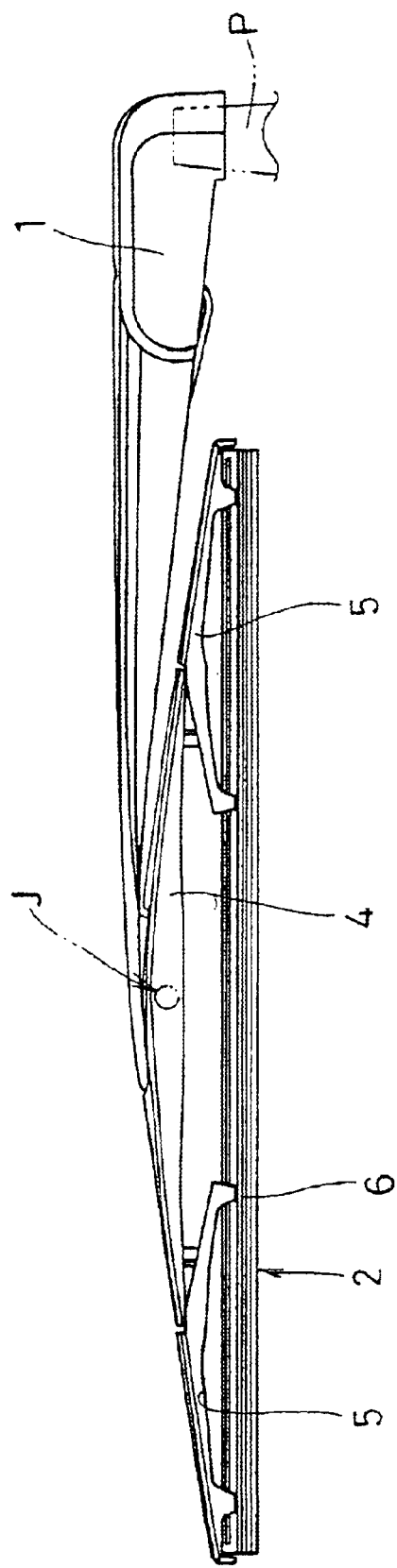
FIG. 1 is an overall front view of the wiper unit in that a first embodiment has been carried out.
Figure 2:
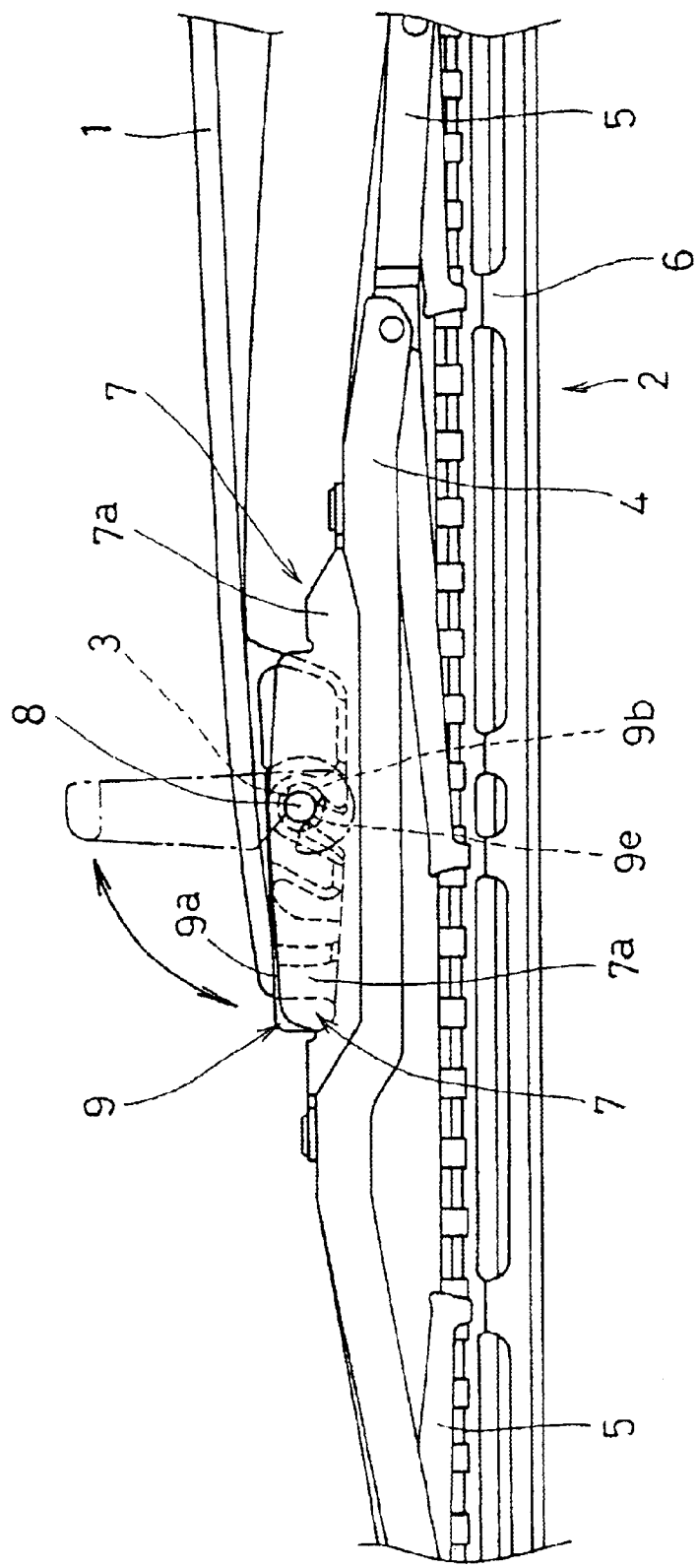
FIG. 2 is a front view of the major part in that a first embodiment has been carried out.
Figure 3:
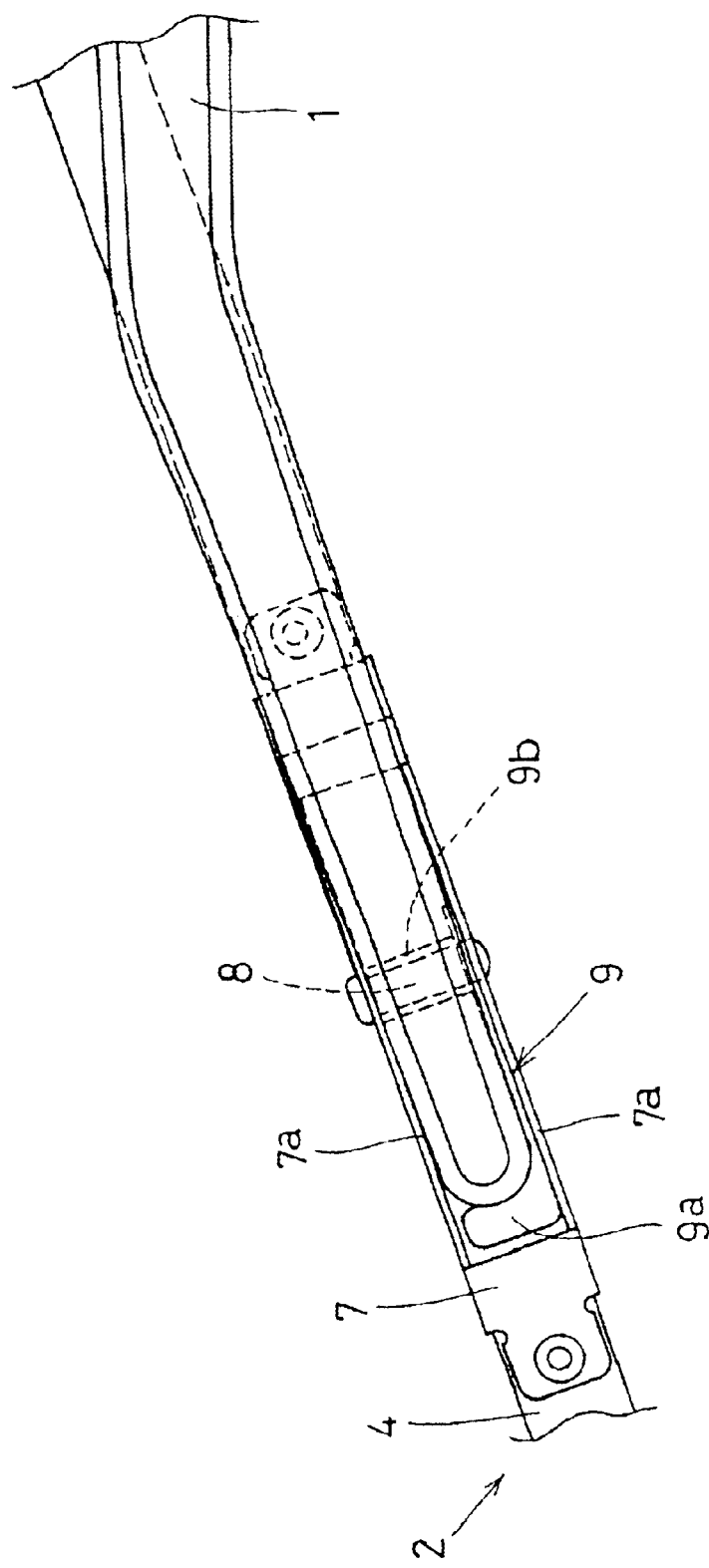
FIG. 3 is a plan of the major part in that a first embodiment has been carried out.
Figure 4A:
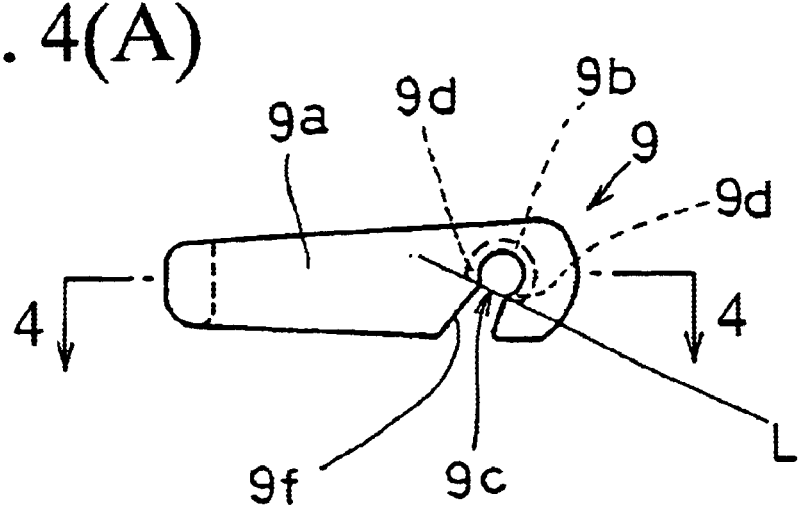
FIG. 4(A) is a front view of the spacer.
Figure 4B:
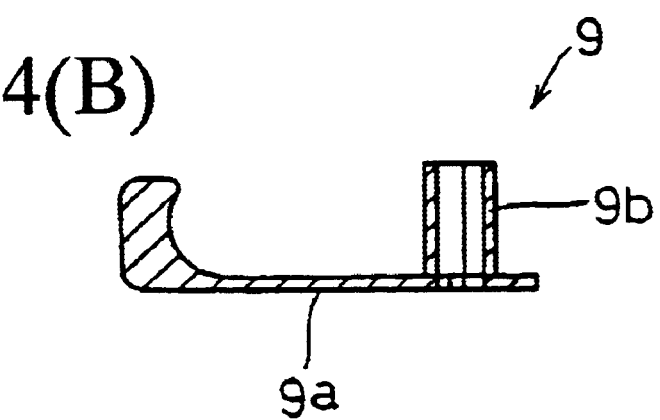
FIG. 4(B) is a section along A—A of FIG. 4(A).

Now, a first embodiment of the invention will be described with reference to the drawings.

In the drawings, 1 denotes a wiper arm made of a resin and the wiper arm, with the base end thereof fixed on a pivot shaft P which is provided on a vehicle main body, performs reciprocative wiping swings with the pivot shaft P as one body. And a blade 2 is rotatably and detachably attached (supported) on the front end portion of the wiper arm 1, which will be described later.

Namely, on the front end portion of the wiper arm 1, an attaching groove 3 whose lower side (the blade 2 side) is opened is formed in a condition where the groove inclines gradually toward the arm front end side on the lower side. A groove inner portion 3a located on the groove inner side of the said attaching groove 3 is formed into an inside cylindrical shape having a diameter R, while a first groove edge 3b on one side (front end side of the arm) which continues from the said attaching groove 3a is formed in a liner shape so as to coincide with a tangent line along the direction of the above-described indination from the groove inner portion 3a. On the other hand, a second groove edge 3c on the other side (base end side of the arm) is formed so that the position thereof shifts to the front end side beyond the position of the tangent line along the direction of the above-described inclination, and thus the groove width S of a groove entrance portion 3d is set to be smaller than the diameter R (R>S) and the dovetail groove shape is provided when the groove is viewed from the side.

On the other hand, the blade 2 consists of members such as a primary lever 4 and a secondary lever 5 made of a resin, a blade rubber 6 and the like, and an attaching bracket 7, which is formed so as to surround the periphery of the primary lever 4, is fixed at the center portion in the longitudinal direction of the primary lever 4. Between right and left attaching edges 7a formed on the attaching bracket 7, a columnar fixed shaft 8, whose diameter is set to be X which is smaller than the diameter R of the groove inner portion 3a of the attaching groove by A (R=A+X), is fixedly fitted.

In addition, 9 denotes a spacer which, together with the fixed shaft 8, constructs a connecting shaft J of the present invention by being incorporated into the fixed shaft as described later. The spacer 9 is formed of a resin material and provided with a lever portion 9a which is adjacent to at least one attaching edge 7a of the attaching bracket 7 and a cylindrical sliding portion 9b which is formed on the base end portion of the said lever portion 9a in a protruded manner and fitted to the fixed shaft 8 so as to be slidable in the direction of shaft rotation. Then, the spacer 9 turns (slides) around the sliding portion between the fixed shaft 8 and cylindrical sliding portion 9b as a turning fulcrum and is structured so that the swinging posture can be changed between a stand-up posture where the front end of the lever portion 9a is protruded from the attaching bracket in a stand-up manner and a collapsed posture where the front end of the lever portion 9a is stored in the attaching bracket 7. Furthermore, the cylindrical sliding portion 9b has a cylindrical shape having an inner diameter X which is set to be the same as the diameter (outer diameter) of the fixed shaft 8- and an outer diameter R which is set to be the same as the diameter (inner diameter) R of the groove inner portion 3a of the attaching groove, and the thickness of the cylindrical sliding portion 9b is set to have a dimension of A/2.

Then, an opening 9c having a dimension Y which is narrower than the diameter X of the fixed shaft 8 (X>Y) is formed by notching on the cylindrical sliding portion 9b, and positional settings thereof are such that the outer circumference of the fixed shaft 8 is approximately in contact with an imaginary straight line L that connects both edges 9d of the said opening 9c with each other (that is, it may exactly be in contact with the imaginary straight line L or may slightly be deviated therefrom within a permissible range.) Herein, the outer circumference of the fixed shaft 8 is approximately in contact with the imaginary line L which is set by the opening 9c of the cylindrical sliding portion 9b and the fixed shaft 8 does not easily come off from the cylindrical sliding portion 9b, and thus the fixed shaft 8 and spacer 9 are incorporated with each other in a coming-off preventive manner. Then, in such an incorporated state, a chamfered portion 9e, which is substantially based on the opening 9c of the cylindrical sliding portion 9b, is formed (created) on the outer circumference of the connecting shaft J, a larger diameter portion having an outer diameter R and the outer diameter at the said chamfered portion 9e, that is, a smaller diameter portion which is perpendicular to the imaginary straight line L and passes through the shaft core of the fixed shaft 8 are formed, and the dimension of the smaller diameter portion is set to have a diameter T which approximately coincides with the groove width S of the groove entrance portion 3d or is smaller than the same (T≦S).

Then, the connecting shaft J is set so that when the lever portion 9a is brought into the collapsed posture, the opening 9c (the chamfered portion 9e) faces to the groove entrance portion 3d side of the attaching groove 3 and when the lever portion 9a is brought into the stand-up posture, the opening 9c faces to the side opposed to the first groove edge 3a of the attaching groove 3. In addition, in a case of the construction where the imaginary straight line L is exactly in contact with the outer circumference of the fixed shaft 8 or the construction where the outer circumference of the fixed shaft 8 is slightly protruded, the sum of the outer diameter X of the fixed shaft 8 and the thickness A/2 of the cylindrical sliding portion 9b is equivalent to a smaller diameter T (X+½A=T), and the dimension of the smaller diameter T is set, as mentioned before, to have a diameter which approximately coincides with the groove width S of the groove entrance portion 3d or is smaller than the same (T≦S).

On the other hand, in the lever portion 9a, a through hole, which leads to the cylinder hole of the cylindrical sliding portion 9b and the opening 9c, is formed and a guide groove 9f, which is provided so as to open toward the same direction as the attaching groove 3a when the lever portion 9a is in the collapsed posture, is formed so as to lead to the above-described through hole. The groove width of the guide groove 9f is set so as to gradually widen toward the lower end (the side of the blade 2 when the lever portion 9a is in the collapsed posture).

Then, the spacer 9 is previously incorporated into the blade 2, which has not been attached to the wiper arm 1 yet, and for incorporation thereof, the groove end portion of the guide groove 9f is held against the fixed shaft 8 and in this state, the lever portion 9a is then pressed down, whereby the cylindrical sliding portion 9b is fitted and attached onto the fixed shaft 8 in a forcibly fitted manner. Thus, the spacer 9 is incorporated in the fixed shaft 8 in a state where it is prevented from coming off in the outer diameter direction and set so that the connecting shaft J having the chamfered portion 9e formed on the outer circumference thereof is constructed.

In such a construction, procedures for attaching and detaching the blade 2 to and from the wiper arm 1 will now be described.

Figure 5:
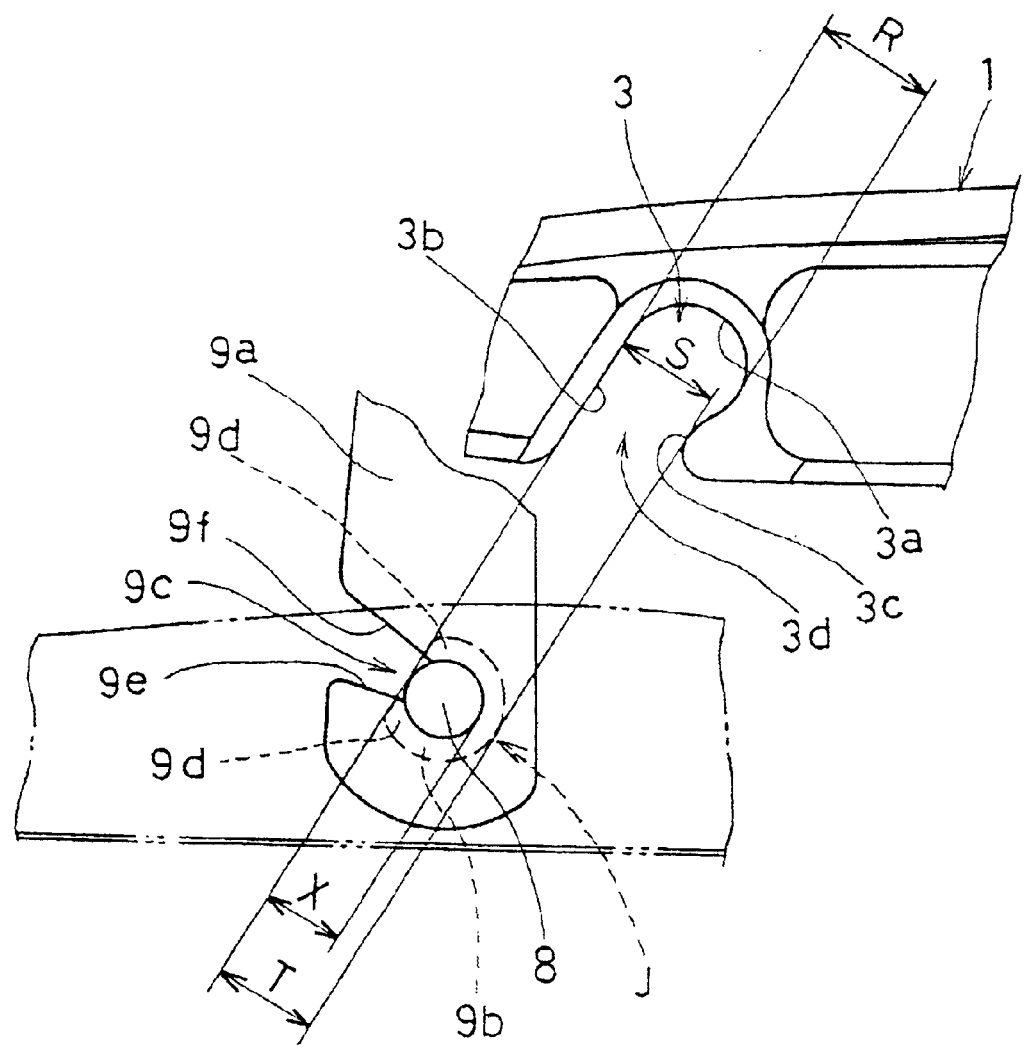
FIG. 5 is an explanatory view showing a condition where the attaching groove and the connecting shaft is connected.
Figure 6A:
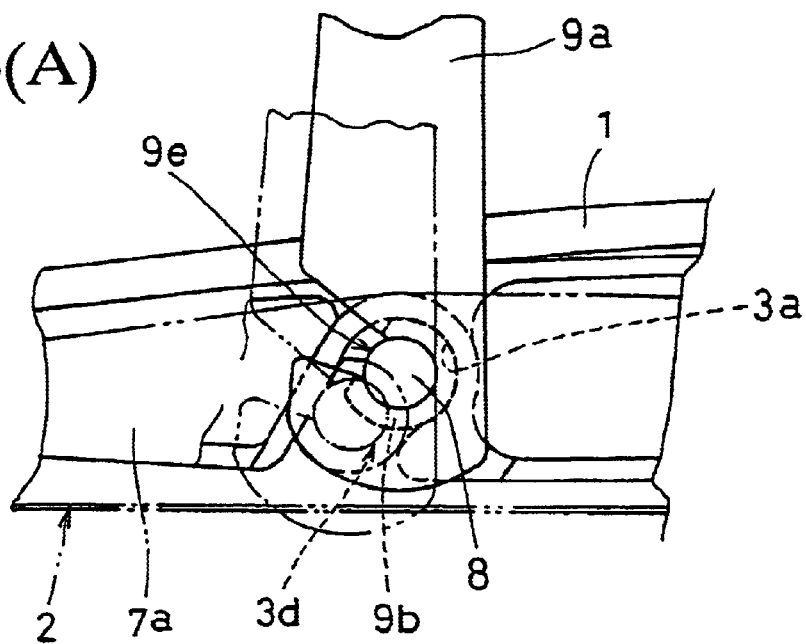
FIG. 6(A) and FIG. 6(B) are explanatory views each showing a condition where the attaching groove and the connecting shaft are connected.

First, when attaching the blade 2, the spacer 9 is incorporated in the fixed shaft 8 of the blade 2, which is refered to a connecting shaft J having the chamfered portion 9e formed on the outer circumference thereof. Then, the lever portion 9a of the spacer 9 is brought into a stand-up posture and set so that the chamfered portion 9e (the opening 9c of the cylindrical sliding portion 9b) faces to the side of the first groove edge 3b of the wiper arm attaching groove 3. Then, as shown in FIG. 5, the spacer thus set is approximated to the groove entrance portion 3d of the wiper arm attaching groove 3 and the chamfered portion 9e of the connecting shaft J and the liner first groove edge 3b of the attaching groove are opposed to each other. In this state, the smaller diameter portion of the connecting shaft J having a small diameter T is opposed to the groove entrance portion 3d having a groove width S which is equal to the small diameter T or is greater than the same; and a setting is provided so that the connecting shaft J is inserted along the first groove edge 3b (the position shown by the imaginary lines of FIG. 6(A)) and then inserted while the position being shifted toward the base end side of the wiper arm 1, whereby as shown by the solid lines of the FIG. 6(A), the connecting shaft can be fitted with the groove inner portion 3a. Thus, a setting is provided so that when the lever portion 9a is brought into a stand-up posture, the connecting shaft J can be fitted to the groove inner portion 3a by only an operation to insert (only to stick) the connecting shaft into the attaching groove 3, and the relationship between the attaching groove 3 and connecting shaft J in such a condition corresponds to an attaching and detaching posture of the present invention.

Figure 6B:
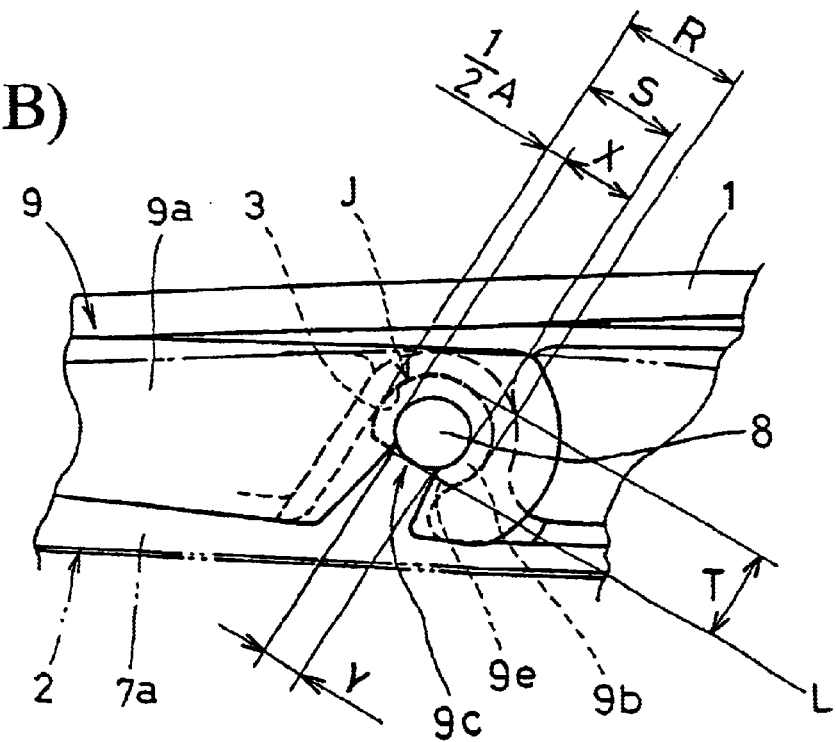

In this condition, when the lever portion 9a is rotated by substantially 90°, brought into a collapsed posture, and stored in the attaching bracket 7, as shown in FIG. 6(B), the connecting shaft J then changes into a state where the chamfered portion 9e faces to the side of the groove entrance portion 3d. When the said state is provided, the connecting shaft J is prevented from coming off from the attaching groove 3, whereby the blade 2 is swingably connected to the wiper arm, and the relationship between the attaching groove and connecting shaft J in this state corresponds to a connected posture of the present invention. In this state of incorporation, the lever portion 9a is fixed to the front end portion of the blade 2, whereby the spacer 9 is set so as to be integrated into the wiper arm 1 side (attaching groove 3 side).

In addition, wiping-off operation for the window surface are performed by the blade 2 in this state. At this time, since curvature exists on the window surface, the blade 2 performs wiping-off while minutely swinging with respect to the wiper arm 1 and on the other hand, the wiper arm is urged toward the window surface side by an urging spring (which is not illustrated). Therefore, smooth sliding is required at the portion where the attaching groove 3 and the connecting shaft J are connected and it becomes necessary for the said smooth sliding to secure a large area where one makes contact with the other. In addition, since the spacer 9 is integrated into the attaching groove 3 side, when the blade 2 swings, sliding is performed between the inner circumferential surface of the spacer cylindrical sliding portion 9b and fixed shaft 8. As a result of the sliding of the fixed shaft 8 which is formed in a columnar shape without a notched portion with respect to the spacer cylindrical sliding portion 9b, a large contact area is secured in the slidably contacted portion and stable sliding can be performed. Furthermore, with employment of the collapsed posture of the lever portion 9a, the groove shape of the attaching groove 3 is set so that the chamfered portion 9e is opposed to the groove entrance portion 3d of the attaching groove, therefore a pressure force which the fixed shaft 8 receives from the window surface side based on the urging spring does not act on the opening 9c side (but acts on the side opposite to the opening). In addition, the state where the chamfered portion 9e is opposed to the groove entrance portion 3d of the attaching groove indicates that the connected portion between the fixed shaft 8 and cylindrical sliding portion 9b is opposed to the opening portion of the groove entrance portion 3d, however, as mentioned before, since the fixed shaft 8 and the cylinder sliding portion 9b are in a comings preventive condition and the lever portion 9a is also incorporated in a forcibly fitted manner, the wiper arm 1 and the blade 2 do not easily come apart in this condition.

In the present embodiment, while the spacer 9 is incorporated into the wiper arm 1 side, the spacer 9 may be incorporated into the attaching bracket 7 of the blade 2 so as to be incorporated into the blade 2 side. In this case, the blade 2 swings, whereby sliding is performed between the outer circumferential surface of the spacer cylindrical sliding portion 9a and the inner circumferential surface of the attaching groove 3.

When the blade 2 in the connected condition is detached from the wiper arm 1, the lever portion 9a of the spacer 9 in the connected posture is brought into the stand-up posture and the chamfered portion 9e of the connecting shaft J is opposed to the first groove edge 3b, thus an attaching and detaching posture is produced where the smaller diameter portion having a small diameter T of the connecting shaft J is opposed to the groove entrance portion 3d. In this state, by drawing out (extracting) the connecting shaft J of the blade 2 while shifting the same toward the front end side of the wiper arm 1, the connection between the connecting shaft J and the attaching groove 3 are released, thus the blade 2 can be detached.

In the structure as described above, for attaching and detaching the blade 2 to and from the wiper arm 1, the lever portion 9a of the spacer 9 incorporated in the fixed shaft 8 of the blade 2 is brought into a stand-up posture and the chamfered portion 9e of the connecting shaft J (the opening 9c of the cylindrical sliding portion 9b) is faced toward the first groove edge 3b side of the wiper arm attaching groove 3 and an attaching and detaching posture is produced. In this state, as mentioned before, the smaller diameter portion having a small diameter T which can be inserted in the groove width S of the groove entrance portion 3d of the attaching groove 3 is opposed to the connecting shaft J, attachment and detachment between the connecting shaft J and attaching groove 3 can be easily performed by only inserting and drawing out the shaft, and no fitting load acts on the attaching groove 3 and the connecting shaft J. Consequently, operations for attaching and detaching the blade 2 to and from the wiper arm 1 becomes easy, while the blade 2 in an attached condition is securely attached to the wiper arm 1, thereby improving workability during replacement of the blade 2. In addition, since no load acts on the attaching and detaching operation, even if a wiper arm 1 made of resin is used, no defect exists such that the attaching groove 3 is worn, durability of the product can be improved, and reliability thereof can be enhanced.

Moreover, herein, when the wiper arm 1 and the blade 2 are connected, a setting is provided such that when the attaching groove 3 and the connecting shaft J are brought in the connected posture, the chamfered portion 9e is opposed to the groove entrance portion 3d, that is, a setting is provided such that the spacer opening 9c is opposed to the groove entrance 3d of the attaching groove, and furthermore, the spacer 9 is incorporated in the wiper arm 1 side. Therefore, as a slight swing of the blade 2, sliding movement is performed in response to a contact area which is widely secured between the spacer cylindrical sliding portion 9b and the fixed shaft 8 and stable swings can be performed. Moreover, the pressure force by the urging spring on the wiper arm 1 side acts on the widely secured sliding surface but does not act on the chamfered portion 9b and spacer opening 9c, therefore the cylindrical sliding portion 9b effectively functions as a bearing and the swinging actions of the blade 2 can be smoothly performed. In this case, if the blade 2 is made to swing counterclockwise by approximately 90° with respect to the wiper arm 1, the chamfered portion 9e of the connecting shaft J is opposed to the first groove edge 3b of the attaching groove without operation of the spacer lever portion 9a and, as a result, the connecting shaft J comes off from the attaching groove 3. However, herein, the counterclockwise swing of the blade 2 is restricted so as not to be carried out by approximately 90° by bringing the primary lever 4 on the blade 2 side into contact with the wiper arm 1. Accordingly, for example, even in a case where the wiper arm 1 lying on the window surface is raised and the blade 2 is made to swing during a car wash, a defect such that the blade unexpectedly comes apart from the wiper arm 1 can be securely prevented. In addition, during the clockwise swing of the blade 2, the blade 2 does not come apart from the wiper arm 1.

Needless to say, the present invention is not limited to the above-described embodiment, and as mentioned before, a construction may also be employed, wherein the connecting shaft on which the chamfered portion is formed is fixed to the blade as one body and the wiper arm is made to turn (swing) so that the posture of the attaching groove can be changed with respect to the said fixed connecting shaft. In this case, the positional relationship between the chamfered portion of the connecting shaft and the groove entrance portion of the attaching groove is important, and as a matter of course, a setting is provided so that the attaching groove and connecting shaft maintain the connected posture within the swinging range of the wiper arm and blade and change into an attaching and detaching posture based on a swing exceeding the said swinging range.

Figure 7:
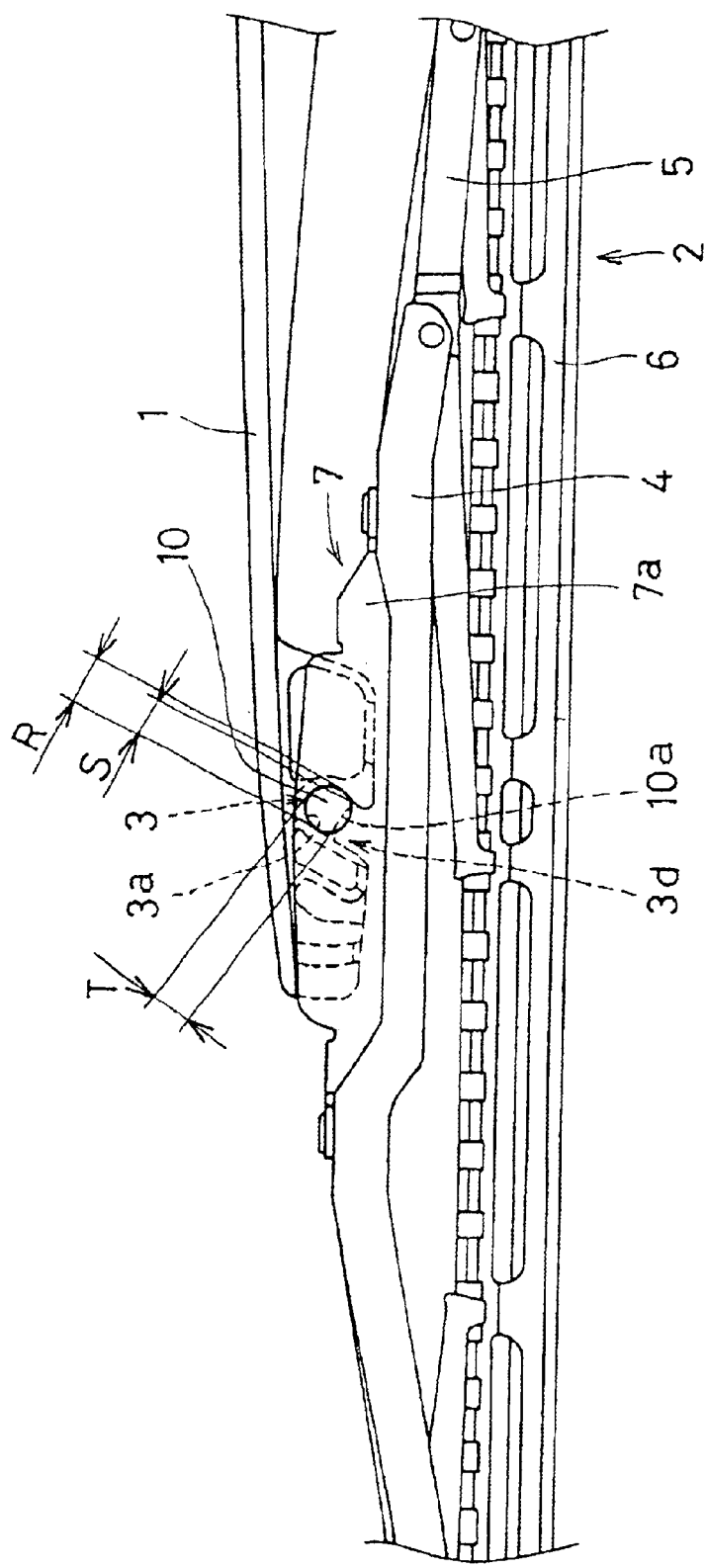
FIG. 7 is a front view of the major part in that a second embodiment has been carried out.
Figure 8:
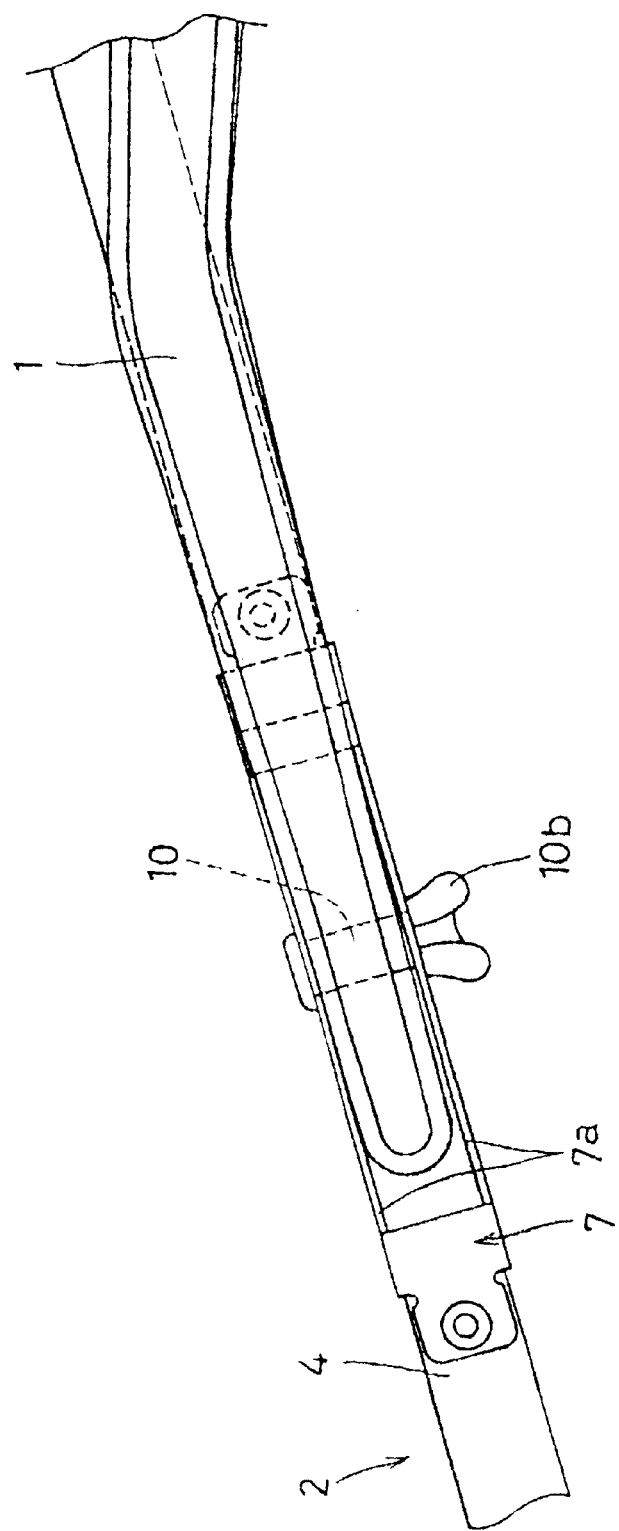
FIG. 8 is a plan of the major part in that a second embodiment has been carried out.

In addition, a construction such as a second embodiment shown in FIGS. 7 and 8 may also be employed. Namely, a connecting shaft 10 of the second embodiment has an outer diameter equivalent to the inner diameter R of the groove inner portion 3a of the attaching groove 3 and a chamfered portion 10a is provided on the outer circumference, whereby a smaller diameter portion having a diameter which is equal to the groove width S of the groove entrance portion 3d or equivalent to the diameter T that is smaller than the groove width S. And such connecting shaft 10 is supported on the attaching bracket 7 of the blade 2 side so as to be slidable in the direction of shaft rotation. A pincher (which corresponds to an adjusting member of the present invention) 10b is formed on one end portion of the connection shaft 10 as one body. The pincher 10b is arranged so as to be exposed outside the attaching bracket attaching edge 7a, the connecting shaft 10 can be slid in the direction of shaft rotation by turning and operating the pincher 10b, thus the postural relationship between the attaching groove 3 and connecting shaft 10 can be changed into a connected posture and an attaching and detaching posture. Furthermore, a posture retaining means (Which is not illustrated) is releasably provided in the pincher 10 and retains the connecting shaft 10 in a connected posture. Thus, in a case where the blade 2 is replaced, the posture retaining means is released and the pincher 10b is turned so as to produce an attaching and detaching posture, whereby making it possible to easily detach the blade 2. And, advantages thereof are the same as those of the first embodiment.

Figure 9:
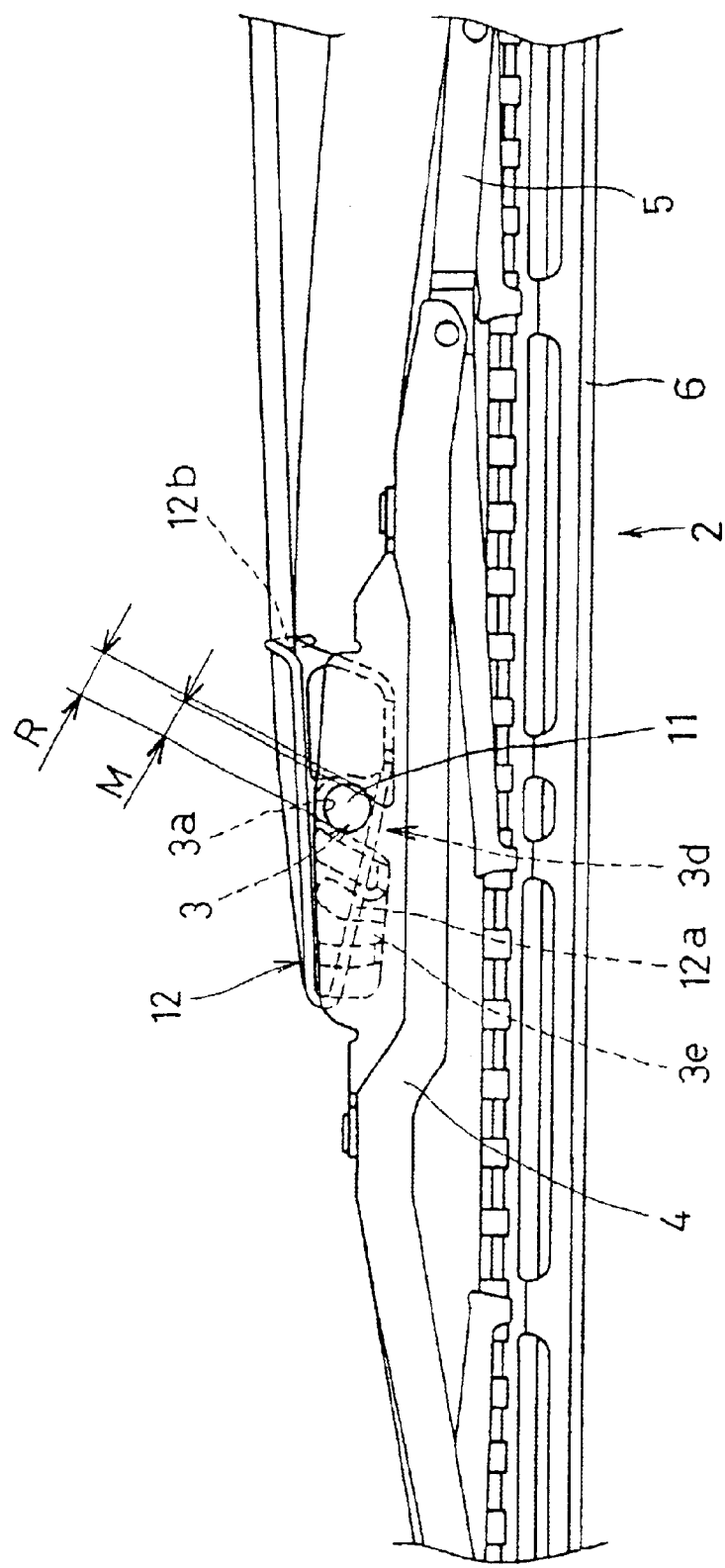
FIG. 9 is a front view of the major part in that a third embodiment has been carried out.
Figure 10:
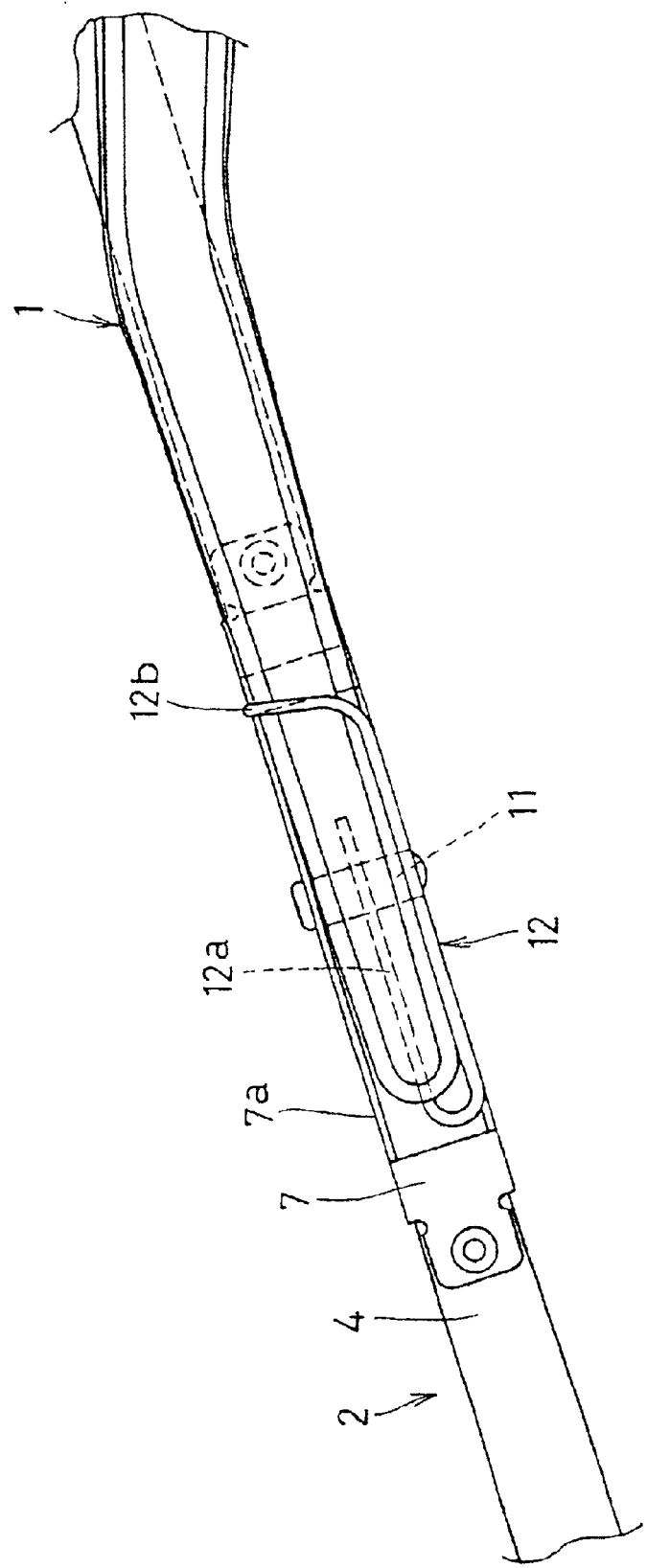
FIG. 10 is a plan of the major part in that a third embodiment has been carried out.

Now, a third embodiment of the present embodiment shown in FIGS. 9 and 10 will be described. On the attaching groove 3 of the present embodiment, a groove entrance portion 3d having a groove width M slightly smaller in diameter than the inner diameter R of the groove inner portion 3a is formed. Therefore, in order to make the attaching groove 3 support a cylindrical fixed shaft 11 having an outer diameter which is the same as the inner diameter R of the groove inner portion 3a, fitting and supporting can be performed by light press fitting. Since the fixed shaft 11 in such a lightly press-fitted condition can be easily fitted into the attaching groove 3, coming-off thereof is also easy, and such a condition corresponds to the attaching and detaching posture of the present invention.

On the other hand, 12 denotes a stopper pin and the stopper pin 12 can be formed by turning up and bending a resilient steel material and a stopper portion 12a which is one of the turned-up portions is urged in the direction where the turned-up portions come close to each other. Then, the stopper pin 12 is attached by inserting it from the front end side of the wiper arm 1 while forcibly expanding the stopper portion 12a, and the stopper portion 12a, which penetrates through a rib 3e formed on the attaching groove 3, is brought into contact, in a pressured manner, with the outer circumference of the fixed shaft 11, which is exposed from the groove entrance portion 3d of the attaching groove 3. Thereby, the stopper portion 12a in a condition where an urging force is applied is brought into contact with the fixed shaft 11 and prevents the fixed shaft 11 from coming off from the attaching groove 3. Thus, the connecting shaft comprises the fixed shaft 11 and the stopper pin 12, and the condition where the stopper pin 12 is attached and coming-off is prevented corresponds to the connected posture of the present invention.

In addition, 12b denotes an engaging portion for fixing the stopper pin 12 on the wiper arm 1, and by engaging and supporting the said engaging portion 12b on the wiper arm 1, the stopper pin 12 is fixed so as to be resiliently held between the wiper arm 1 and blade 2. The resilience of the stopper pin 12 is set to an extent that the blade 2 is not hindered from swinging with respect to the wiper arm 1 around the fixed shaft 11 as a fulcrum.

Thus, in the structure according to the third embodiment, based on the attachment and detachment of the stopper pin 12, the relationship between the attaching groove 3 and a connecting shaft (the fixed shaft 11 and the stopper pin 12) can be changed into a connected posture and an attaching and detaching posture. Similar to the first embodiment, also in this case, replacing operations of the blade can be simplified and construction where no load is applied to the attaching groove 3 can improve durability, while the wiper arm 1 and the blade 2 can be securely attached.

Figure 11:
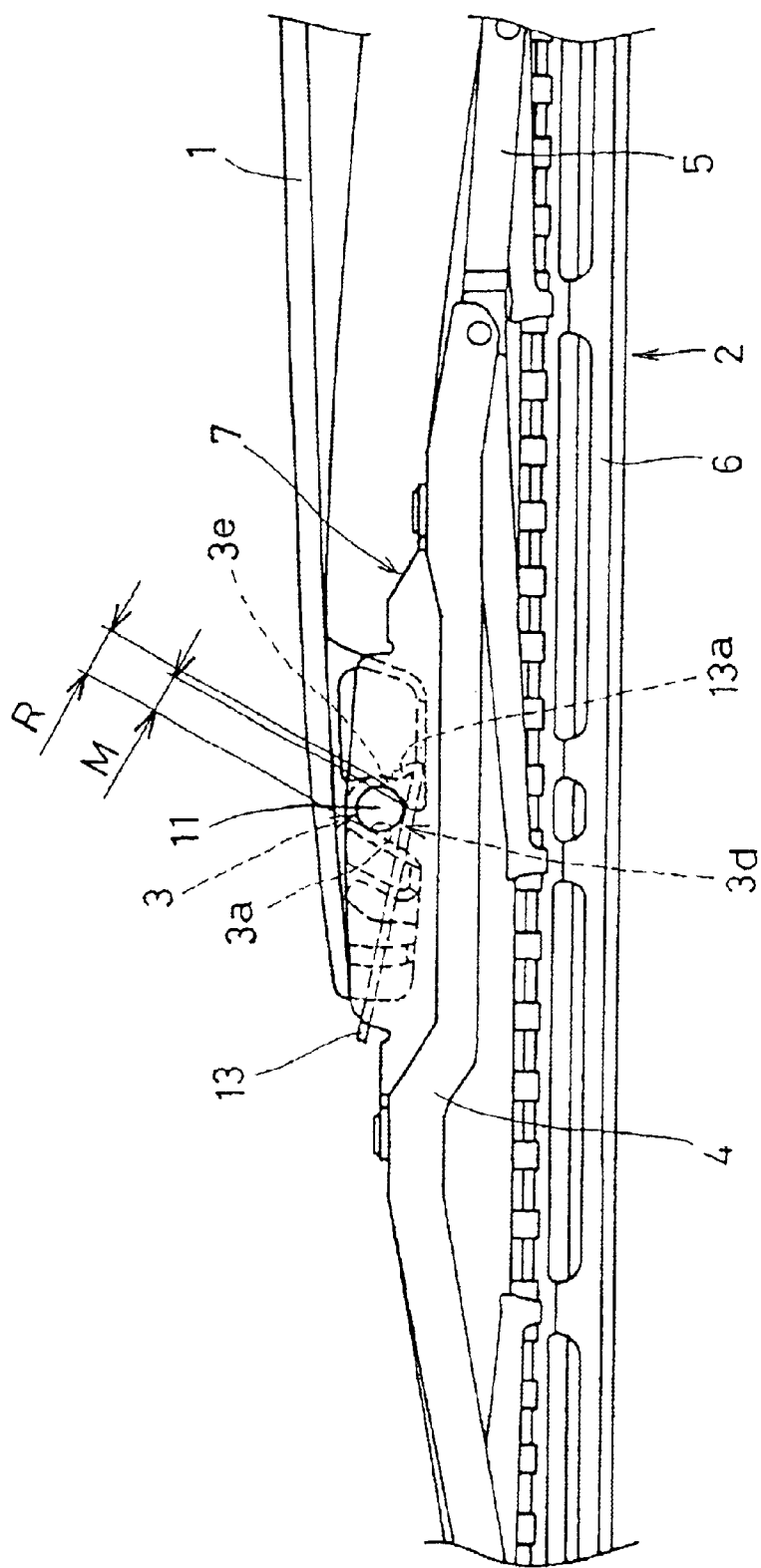
FIG. 11 is a front view of the major part in that a fourth embodiment has been carried out.
Figure 12:
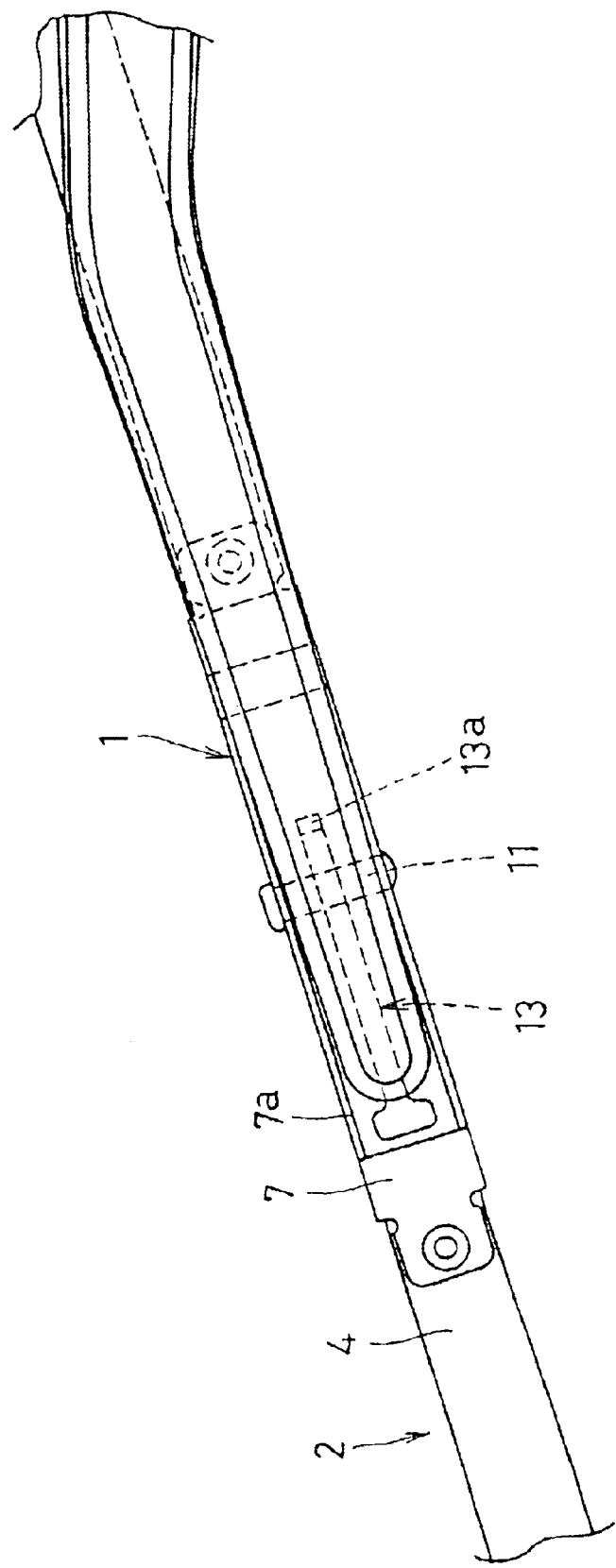
FIG. 12 is a plan of the major part in that a fourth embodiment has been carried out.

Furthermore, a fourth embodiment shown in FIGS. 11 and 12 will be described. The attaching groove 3 and the fixed shaft 11 according to the present embodiment have the same structure as that of the third embodiment, the groove entrance portion 3d having a groove width M which is slightly smaller in diameter than the inner diameter R of the groove inner portion 3a is formed, and the fixed shaft 11 can be fitted and supported on the attaching groove 3 by light press-fitting. Such a condition where the fixed shaft 11 can be easily attached and detached to and from the attaching groove 3 corresponds to the attaching and detaching posture of the present invention.

Then, similar to the third embodiment, a connected posture is produced between the attaching groove 3 and the fixed shaft 11 by attaching a stopper pin 13. The stopper pin 13 of the present embodiment is formed of a plate-like steel material and inserted from the front end side of the wiper arm 1 via the rib 3e, thus the inserted front end portion prevents the fixed shaft 11 which faces to the groove entrance portion 3d from coming off, and the stopper pin 13 is fixed to the wiper arm 1 by rotating to engage an engaging projection 13a, which is bent and formed on the front end portion of the stopper pin 13, with the rib 3b after setting the stopper pin 13. Such a condition where the stopper pin 13 prevents the fixed shaft 11 from coming off corresponds to the connected posture between the attaching groove 3 and connecting shaft (fixed shaft 11 and stopper pin 13) according to the present invention.

By thus constructing, based on the attaching and detaching of the stopper pin 13, the relationship between the attaching groove 3 and the fixed shaft 11 is changed into the connected posture and the attaching and detaching posture. Similar to the first embodiment, also in this case, blade replacing operations can be simplified and construction where no load is applied to the attaching groove 3 can improve durability, while the wiper arm 1 and the blade 2 can be securely attached.

Figure 13:
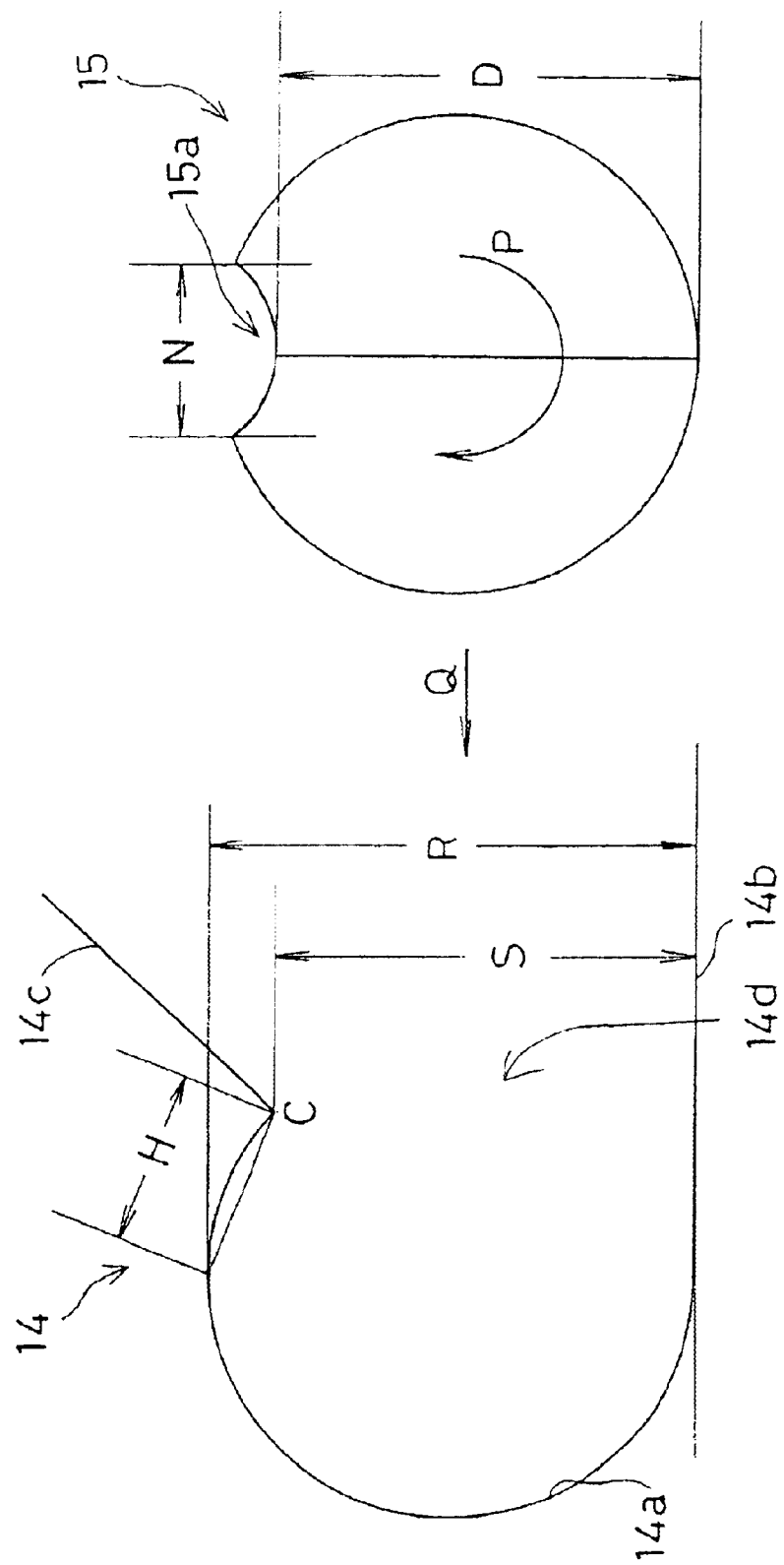
FIG. 13 is a front view of the major part showing the attaching groove and connecting shaft in that a fifth embodiment has been carried out.

Furthermore, a fifth embodiment will be described based on FIGS. 13 and 14.

An attaching groove 14 formed on the wiper arm 1 of the preset embodiment is formed similarly to that of the above-described embodiments. That is, an attaching groove 14a located on the groove inner side is formed in an inside cylindrical shape having a diameter R and the said inside cylindrical shape is closer to a cylinder than a semi-cylinder by a portion equivalent to the chord H. Moreover, a first groove edge 14b which leads to a groove inner portion 14a of the attaching groove coincides with a tangent line at one end portion of the groove inner portion 14a, a second groove edge 14c on the other side is formed from the other end portion so as to expand and open obtusely, whereby the groove width S of a groove entrance portion 14d becomes smaller than the inner diameter R of the groove inner portion 14a (R>S), and thus the attaching groove 14 has a dovetail groove shape when the groove is viewed from the side. At this time, the chord H is set so as to become smaller than the groove width S of the groove entrance portion 14d (H<S).

On the other hand, a connecting shaft 15 has a columnar shape having an outside diameter approximately equal to the inner diameter R of the groove inner portion 14a of the attaching groove and a long dent groove 15a is formed on the outer circumferential surface in the shaft direction, and the said connecting shaft 15 is attached to the blade 2. The dent groove 15a is formed to have an approximately arc-shaped groove surface, dimensions are set so that the groove width N in the circumferential direction becomes grater than the chord H which corresponds to a portion exceeding a semi cylinder of the attaching groove 14 (N≧H) and the maximum depth D of the groove depth becomes smaller than the groove width S of the groove entrance portion 14d of the attaching groove 14 (D≦S). Incidentally, the dent groove 15a is not limited to having an arc-shape as long as it is provided with the groove width of N and the maximum groove depth of D and an appropriate shape, for example, a V-groove, a rectangular groove or the like can be employed.

Then, the connecting shaft 15 on the blade 2 side is held against a connecting shaft dent groove 15a in a condition where a corner portion C of the second groove edge 14c side of the groove entrance portion 14d on the wiper arm 1 side is fitted. In this condition, the connecting shaft 15 is then rotated relatively with respect to the attaching groove 14 (in the direction of arrow P) to change the posture of the dent groove 15a opposed to the corner portion C, while the connecting shaft 15 is shifted toward the groove inner portion 14a side (in the direction of arrow Q), and whereby connection between the connecting shaft 15 and the attaching groove 14 is accomplished. And such a condition where the attaching groove 14 and the connecting shaft 15 are attached and detached while being rotated corresponds to the attaching and detaching posture of the present invention, and furthermore, the connecting shaft 15 is prevented from coming off from the attaching groove 14 by rotating the connecting shaft 15 so that the dent groove 15 reaches to a position shifted from the corner portion C and this posture corresponds to the connected posture of the present invention.

By structure as such, similar to the above-described embodiments, the attaching and detaching operations of the connecting shaft 15 with respect to the attaching groove 14 becomes easy, the replacement operation of the blade 2 becomes easy, and furthermore, no load acts on the attaching groove 14 during the said replacement operation, thus making it possible to improve durability.

Figure 14:
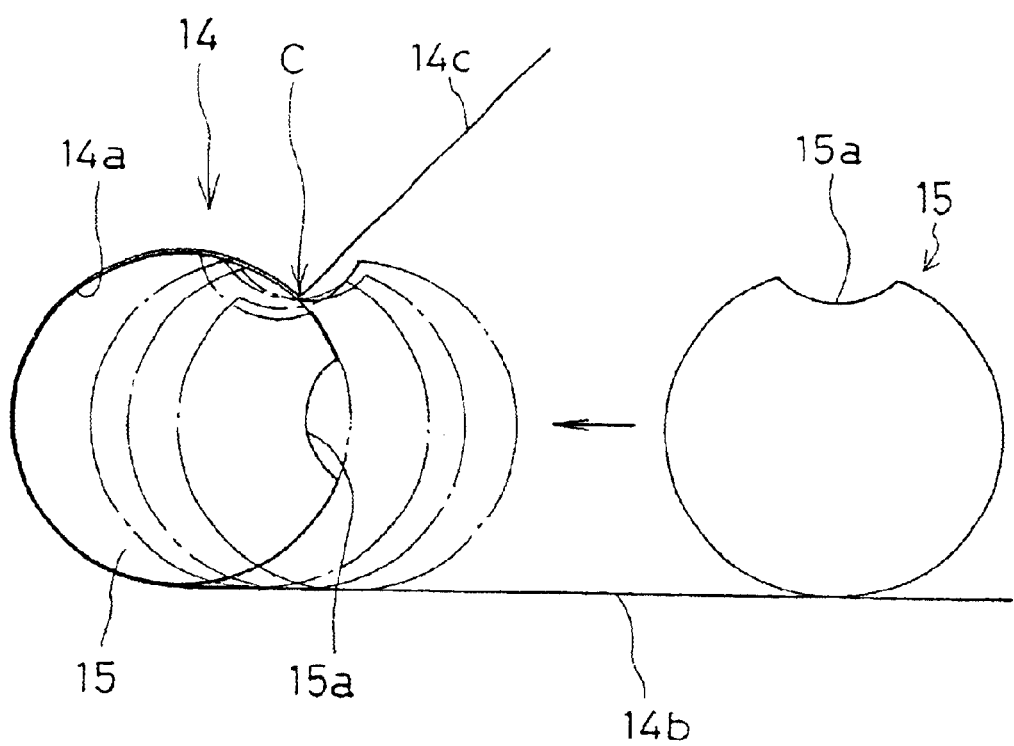
FIG. 14 is an action explanatory view showing a condition of connection in that a fifth embodiment has been carried out.

In the connected posture where the connecting shaft 15 is incorporated in the groove inner portion 14a in a coming-off preventive manner, as shown in FIG. 14, the dent grove 15a can be set so as to be located at the groove entrance portion 14d. If such a setting is employed, the outer circumferential surface of the connecting shaft 15 slides beyond the whole inner circumferential surface of the groove inner portion 14a in a manner of surface contact.

In terms of the relationship between the attaching groove 14 and connecting shaft 15, as mentioned above, the sliding area therebetween is widely secured and wiping operations are performed with a minute swing between the wiper arm 1 and blade 2 being absorbed. In addition, if curvature of the window surface becomes great in this condition, then the connecting shaft 15 attached on the blade 2 side swings relatively to the wiper arm 1 which is pressed toward the window surface according to the curved window surface, therefore, it is necessary to secure the sliding surface of the connecting shaft 15a to be wider than the sliding surface of the attaching groove 14. However, this cannot be easily carried out in such a construction as the first embodiment where the notch portion is formed on the connecting shaft. Nevertheless, as mentioned before, the groove width N of the dent groove 15a of the connecting shaft 15 is set to be equal to or slightly greater than the chord H and the said chord H is also set to be smaller than the groove width S of the groove entrance portion 14d in the present embodiment, whereby the sliding surface of the connecting shaft 15, that is, the outer circumferential surface excluding the dent groove 15a can be secured to be longer than the sliding surface which is set by the groove inner portion 14a. Thus, in the connected posture, even if the sliding surface of the connecting shaft 15 is exposed from the groove inner portion 14a and reaches to the part opposed to the groove entrance portion 14d and then the blade 2 swings in accordance with the curved surface, the swing can be received by the sliding surface of the connecting shaft 15, and consequently, stable wiping operations can also be performed even on a window surface having greater curvature.

Herein, the connecting shaft 15 of the present embodiment is fixedly attached to the attaching bracket 7 of the blade 2 and when the connecting shaft 15 is attached and detached to and from the wiper arm attaching groove 14, the attaching and detaching operation is performed while the posture of the wiper arm 1 or the blade 2 is changed. However, a structure may be employed such that the connecting shaft 15 is slidably incorporated into the attaching bracket 7, and an embodiment of this case can be carried out by providing, for example, a pincher on one end portion in the shaft direction of the connecting shaft 15 so as to protrude outside the attaching bracket 7 and then performing the attaching and detaching operation while rotating the said pincher.

INDUSTRIAL APPLICABILITY

By constructing as such, the connecting shaft can be securely connected to the attaching groove. On the other hand, not only can the attaching and detaching operations be simplified but also it becomes possible to prevent an attaching and detaching load from being applied to the attaching groove.

What is claimed is:

1. A blade attaching structure of a wiper unit, comprising:
   an attaching groove formed on a wiper arm; and
   a connecting shaft provided on a blade for wiping a window surface, the connecting shaft detachably and rotatably supported by the attaching groove, wherein:
   the attaching groove is provided with a groove inner portion having a larger diameter than the connecting shaft and a groove entrance portion having a width narrower than the groove inner portion,
   postures of the attaching groove and the connecting shaft are changed between a connected posture where the connecting shaft is prevented from coming off from the groove entrance portion, and attaching and detaching postures where the connecting shaft can freely enter or exit from the groove entrance portion, and
   the connecting shaft is supported on the blade attaching structure to be slidable in a rotational direction of the shaft, the connecting shaft having a larger diameter portion and a smaller diameter portion smaller than the larger diameter portion due to a chamfered portion created on the outer circumference of the connecting shaft, and changing postures is accomplished by operating an adjusting member integrally formed on a connecting shaft end portion to make the connecting shaft slide in the rotational direction of the shaft.

2. The blade attaching structure of the wiper unit as set forth in claim 1, wherein larger diameter portion has a same diameter as the groove inner portion and the smaller diameter portion has a diameter less than the groove entrance portion.

3. The blade attaching structure of the wiper unit as set forth in claim 2, wherein the difference in diameter between the groove inner portion and the groove entrance portion is approximately half the difference between the larger diameter portion and the smaller diameter portion.

4. A blade attaching structure of a wiper unit, comprising:
   an attaching groove formed on a wiper arm; and
   a connecting shaft provided on a blade for wiping a window surface, the connecting shaft detachably and rotatable supported by the attaching groove, wherein:
   the attaching groove is provided with a groove inner portion having a larger diameter than the connecting shaft and a groove entrance portion having a width narrower than the groove inner portion,
   postures of the attaching groove and the connecting shaft are changed between a connected posture where the connecting shaft is prevented from coming off from the groove entrance portion, and attaching and detaching postures where the connecting shaft can freely enter or exit from the groove entrance portion, and
   the connecting shaft comprises a larger diameter portion and a smaller diameter portion smaller than the larger diameter portion formed by externally fitting a cylindrical sliding portion having a chamfered portion formed on the outer circumference to a fixed shaft integrally fixed to the blade to be slidable in a rotational direction of the shaft, and changing postures are accomplished based on the slide of the cylindrical sliding portion in the rotational direction of the shaft.

5. A method of attaching a blade to a wiper unit with a blade attaching structure comprising an attaching groove formed on a wiper arm and a connecting shaft provided on the blade, the method comprising the steps of:
   moving the connecting shaft into the attaching groove where the connecting shaft can freely enter or exit from the attaching groove; and
   changing a posture of the connecting shaft where the connecting shaft is prevented from coming off from the attaching portion, wherein:
   the attaching groove is provided with a groove inner portion having a larger diameter than the connecting shaft and a groove entrance portion having a width narrower than a groove inner portion, and
   the connecting shaft is supported on the blade attaching structure to be slidable in a rotational direction of the shaft, the connecting shaft having a larger diameter portion and a smaller diameter portion smaller than the larger diameter portion due to a chamfered portion created on the outer circumference of the connecting portion, and changing postures are accomplished by operating an adjusting member integrally formed on the connecting shaft end portion to make the connecting shaft slide in the rotational direction of the shaft.

6. The method of claim 5, wherein larger diameter portion has a same diameter as the groove inner portion, and the smaller diameter portion has a diameter less than the groove entrance portion.

7. A method of attaching a blade to a wiper unit with a blade attaching structure comprising an attaching groove formed on a wiper arm and a connecting shaft provided on the blade, the method comprising the steps of:
   moving the connecting shaft into the attaching groove where the connecting shaft can freely enter or exit from the attaching groove; and
   changing a posture of the connecting shaft where the connecting shaft is prevented from coming off from the attaching portion, wherein:
   the attaching groove is provided with a groove inner portion having a larger diameter than the connecting shaft and a groove entrance portion having a width narrower than the groove inner portion, and
   the connecting shaft comprises a larger diameter portion and a smaller diameter portion smaller than the larger diameter portion formed by externally fitting a cylindrical sliding portion having a chamfered portion formed on the outer circumference to a fixed shaft integrally fixed to the blade to be slidable in a rotational direction of the shaft, such that changing postures are accomplished by sliding the cylindrical sliding portion in the rotational direction of the shaft.

* * * * *